United States Patent
Kopp et al.

(10) Patent No.: US 11,373,115 B2
(45) Date of Patent: Jun. 28, 2022

(54) ASYNCHRONOUS PARAMETER AGGREGATION FOR MACHINE LEARNING

(71) Applicant: HERE Global B.V., Eindhoven (NL)

(72) Inventors: Michael Kopp, Kilchberg (CH); Moritz Neun, Zurich (CH); Michael Sprague, London (GB); Amir Jalalirad, Eindhoven (NL); Marco Scavuzzo, Eindhoven (NL); Catalin Capota, Palatine, IL (US)

(73) Assignee: HERE Global B.V., Eindhoven (NL)

( * ) Notice: Subject to any disclaimer, the term of this patent is extended or adjusted under 35 U.S.C. 154(b) by 1116 days.

(21) Appl. No.: 15/948,493

(22) Filed: Apr. 9, 2018

(65) Prior Publication Data
US 2019/0311298 A1    Oct. 10, 2019

(51) Int. Cl.
  *G06N 20/00*    (2019.01)
  *G01C 25/00*    (2006.01)
  *G06V 20/56*    (2022.01)
  *G06V 30/194*   (2022.01)

(52) U.S. Cl.
  CPC ............ *G06N 20/00* (2019.01); *G01C 25/00* (2013.01); *G06V 20/56* (2022.01); *G06V 30/194* (2022.01)

(58) Field of Classification Search
  USPC .......................................................... 706/12
  See application file for complete search history.

(56) References Cited

U.S. PATENT DOCUMENTS

| | | | |
|---|---|---|---|
| 8,768,870 B1 | 7/2014 | Corrado et al. | |
| 10,185,892 B1* | 1/2019 | Mishra | H04N 17/002 |
| 10,664,722 B1* | 5/2020 | Sharma | G06K 9/6256 |
| 2012/0170835 A1 | 7/2012 | Wang et al. | |
| 2015/0324686 A1 | 11/2015 | Julian et al. | |
| 2015/0324690 A1 | 11/2015 | Chilimbi et al. | |
| 2017/0111234 A1 | 4/2017 | Kadav et al. | |
| 2017/0116520 A1 | 4/2017 | Min et al. | |
| 2017/0185562 A1 | 6/2017 | Hack et al. | |
| 2019/0102674 A1* | 4/2019 | Kwant | G06F 16/93 |
| 2020/0050951 A1 | 2/2020 | Wang | |

OTHER PUBLICATIONS

Bonawitz, Keith, et al. "Towards Federated Learning at Scale: System Design." arXiv preprint arXiv:1902.01046. Feb. 4, 2019. (pp. 1-15).
"Distributed Deep Learning, Part 1: An Introduction to Distributed Training of Neural Networks", Skymind, Nov. 30, 2017, 24 pages, https://blog.skymind.ai/distributed-deep-learning-part-1-an-introduction-to-distributed-training-of-neural-networks/.

(Continued)

*Primary Examiner* — Paul D Lee
(74) *Attorney, Agent, or Firm* — Lempia Summerfield Katz LLC

(57) ABSTRACT

Systems and methods are provided for training a machine learned model on a large number of devices, each device acquiring a local set of training data without sharing data sets across devices. The devices train the model on the respective device's set of training data. The devices communicate a parameter vector from the trained model asynchronously with a parameter server. The parameter server updates a master parameter vector and transmits the master parameter vector to the respective device.

21 Claims, 9 Drawing Sheets

(56) References Cited

OTHER PUBLICATIONS

Abadi et al., "Deep Learning with Differential Privacy", 23rd ACM Conference on Computer and Communications Security, Oct. 25, 2016, 14 pages.
Augustus Odena, "Faster Asynchronous SGD", 2016, 10 pages.
Baytas et al., "Asynchronous Multi-Task Learning", IEEE International Conference on Data Mining, 2016, 10 pages.
Bonawitz et al., "Practical Secure Aggregation for Federated Learning on User-Held Data", 30th Conference on Neural Information Processing Systems (NIPS 2016), Barcelona, Spain, 2016, 5 pages.
Chen et al., "Revisiting Distributed Synchronous SGD", Conference Paper at ICLR 2017, 2017, 10 pages.
Czarnecki et al., "Understanding Synthetic Gradients and Decoupled Neural Interfaces", 2017, 15 pages.
Dean et al., "Large Scale Distributed Deep Networks", Part of Advances in Neural Information Processing Systems 25 (NIPS 2012), 2012, 9 pages.
Foerster et al., "Learning to Communicate with Deep Multi-Agent Reinforcement Learning", 2016, 13 pages.
Gade et al., "Private Learning on Networks", 2016, 22 pages.
Gimpel et al., "Distributed Asynchronous Online Learning for Natural Language Processing", Proceedings of the Conference on Computational Natural Langue Learning, 2010, 11 pages, Carnegie Mellon University, Research Showcase.
Goodfellow et al., "Qualitatively Characterizing Neural Network Optimization Problems", Conference Paper, ICLR 2015, 2015, 20 pages.
Goyal et al., "Accurate, Large Minibatch SGD: Training ImageNet in 1 Hour", Jun. 2017, 12 pages.
Gupta et al., "Model Accuracy and Runtime Tradeoff in Distributed Deep Learning: A Systematic Study", 2016, 10 pages.
Hamm et al., "Crowd-ML: Privacy-Preserving Machine Learning on Smart Devices", Ohio State University Department of Computer Science and Engineering, 18 pages.
Hardy et al., "Distributed Deep Learning on Edge-Devices: Feasibility via Adaptive Compression", 2017, 9 pages.
Hitaj et al., "Deep Models Under the GAN: Information Leakage from Collaborative Deep Learning", 2017, 16 pages.
Jaderberg et al., "Decoupled Neural Interfaces Using Synthetic Gradients", 2016, 20 pages.
Kokkinos et al., "A Distributed Asynchronous and Privacy Preserving Neural Network Ensemble Selection Approach for Peer-to-Peer Data Mining", BCI '12 Proceedings of the Fifth Balkan Conference in Informatics, Sep. 16-20, 2012, pp. 46-51.
Konecny et al., "Federated Learning: Strategies for Improving Communication Efficiency", 2016, 10 pages.
Konecny et al., "Federated Optimization: Distributed Machine Learning for On-Device Intelligence", Oct. 11, 2016, 38 pages.
Li et al., "Scaling Distributed Machine Learning with the Parameter Server", Symposium on Operating Systems Design and Implementation, 2014, 16 pages.
McMahan et al., "Communication-Efficient Learning of Deep Networks from Decentralized Data", Proceedings of the 20th International Conference on Artificial Intelligence and Statistics, Fort Lauderdale, FL, 2017, 11 pages.
McMahan et al., "Delay-Tolerant Algorithms for Asynchronous Distributed Online Learning", Nov. 7, 2014, 16 pages.
Mnih et al., "Asynchronous Methods for Deep Reinforcement Learning", Proceedings of the 33rd International Conference on Machine Learning, 2016, 10 pages.
Monfort et al., "Asynchronous Data Aggregation for Training End to End Visual Control Networks", AAMAS '17 Proceedings of the 16th Conference on Autonomous and MultiAgent Systems, Sao Paulo, Brazil, May 8-12, 2017, pp. 530-537.
Nikko Strom, "Scalable Distributed DNN Training Using Commodity GPU Cloud Computing", Interspeech 2015, 2015, 5 pages.
Qin et al., "Scalable Asynchronous Gradient Descent Optimization for OutofCore Models", Proceedings of the VLDB Endowment, vol. 10, No. 10, 2017, 12 pages.
Rusu et al., "Progressive Neural Networks", 2016, 14 pages.
Shokri et al., "Privacy-Preserving Deep Learning", 22nd ACM Conference on Computer and Communications Security, 2015, 12 pages.
Sokolic et al., "Learning to Succeed while Teaching to Fail: Privacy in Closed Machine Learning Systems", May 24, 2017, 14 pages.
Suresh et al., "Distributed Mean Estimation with Limited Communication", Proceedings of the 34th International Conference on Machine Learning, 2017, 9 pages.
Teerapittayanon et al., "Distributed Deep Neural Networks over the Cloud, the Edge and End Devices", 2017, 12 pages.
Vanhaesebrouck et al., "Decentralized Collaborative Learning of Personalized Models over Networks", International Conference on Artificial Intelligence and Statistics, 2017, 14 pages.
Wakayama et al., "Distributed Forests for MapReduce-Based Machine Learning", 2015 3rd IAPR Asian Conference on Pattern Recoginition (ACPR), Nov. 3-6, 2015, 5 pages.
Xie et al., "Privacy-Preserving Distributed Multi-Task Learning with Asynchronous Updates", KDD 2017 Research Paper, 2017, 10 pages.
Zhang et al., "Deep learning with Elastic Averaging SGD", Advances in Neural Information Processing Systems, 2015, 24 pages.
Zheng et al., "Asynchronous Stochastic Gradient Descent with Delay Compensation", Proceedings of the 34th International Conference on Machine Learning, Sydney Australia, 2017, 10 pages.

\* cited by examiner

ASYNCHRONOUS PARAMETER AGGREGATION FOR MACHINE LEARNING

FIELD

The following disclosure relates to location, navigation, and/or mapping services.

BACKGROUND

Massive volumes of data are collected every day by large number of devices such as smartphones and navigation devices. The data includes everything from user habits to images to speech and beyond. Analysis of the data could improve learning models and user experiences. For example, language models can improve speech recognition and text entry, and image models can help automatically identify photos.

The complex problem of training these models could be solved by large scale distributed computing by taking advantage of the resource storage, computing power, cycles, content, and bandwidth of participating devices available at edges of a network. In such a distributed machine learning scenario, the dataset is transmitted to or stored among multiple edge devices. The devices solve a distributed optimization problem to collectively learn the underlying model. For distributed computing, similar (or identical) datasets may be allocated to multiple devices that are then able to solve a problem in parallel.

However, privacy and connectivity concerns may prohibit data from being shared between devices preventing larges-cale distributed methods. Users may prefer to not share voice, video, or images with other devices or unknown users. Devices may not be simultaneously or continuously connected and may contain disparate data sets. Bandwidth concerns may prohibit timely sharing of data.

SUMMARY

In an embodiment, a navigation device is provided for training a machine learned model. The device includes at least one sensor, a communications interface, and a device processor. The at least one sensor is configured to acquire training data. The communications interface is configured to communicate with a parameter server. The device processor is configured to train the machine learned model using the training data, transmit a parameter vector of the trained model to the parameter server, and receive in response, an updated central parameter vector from the parameter server. The device processor is further configured to retrain the model using the updated central parameter vector. The navigation device acquires different training data from other devices that are training the model. The at least one transmission between the navigation device and the parameter server occurs asynchronously with respect to the other devices that are training the model.

In an embodiment, a method is provided for training a machine learned model using a plurality of distributed worker devices. A worker device trains a machine learned model using local training data and a set of first parameters. The worker device transmits a set of second parameters of the trained machine learned model to a parameter server. The worker device receives a set of third parameters from the parameter server. The set of third parameters is calculated at least partially as a function of the set of second parameters. The worker device trains the machine learned model using the local training data and the set of third parameters.

In an embodiment, a system is provided for training a machine learned model. The system includes a plurality of worker devices and a parameter server. The plurality of worker devices are configured to train the machine learned model using a set of parameters and respective sets of locally acquired training data. The parameter server is configured to communicate with the plurality of worker devices. The parameter server is configured to receive locally generated sets of parameters of the trained machine learned models from the plurality of worker devices, calculate, and transmit, in response to a communication from a worker device of the plurality of worker devices, a set of central parameters to the respective worker device from which the communication originated.

BRIEF DESCRIPTION OF THE DRAWINGS

Exemplary embodiments of the present invention are described herein with reference to the following figures.

DETAILED DESCRIPTION

Figure 1:
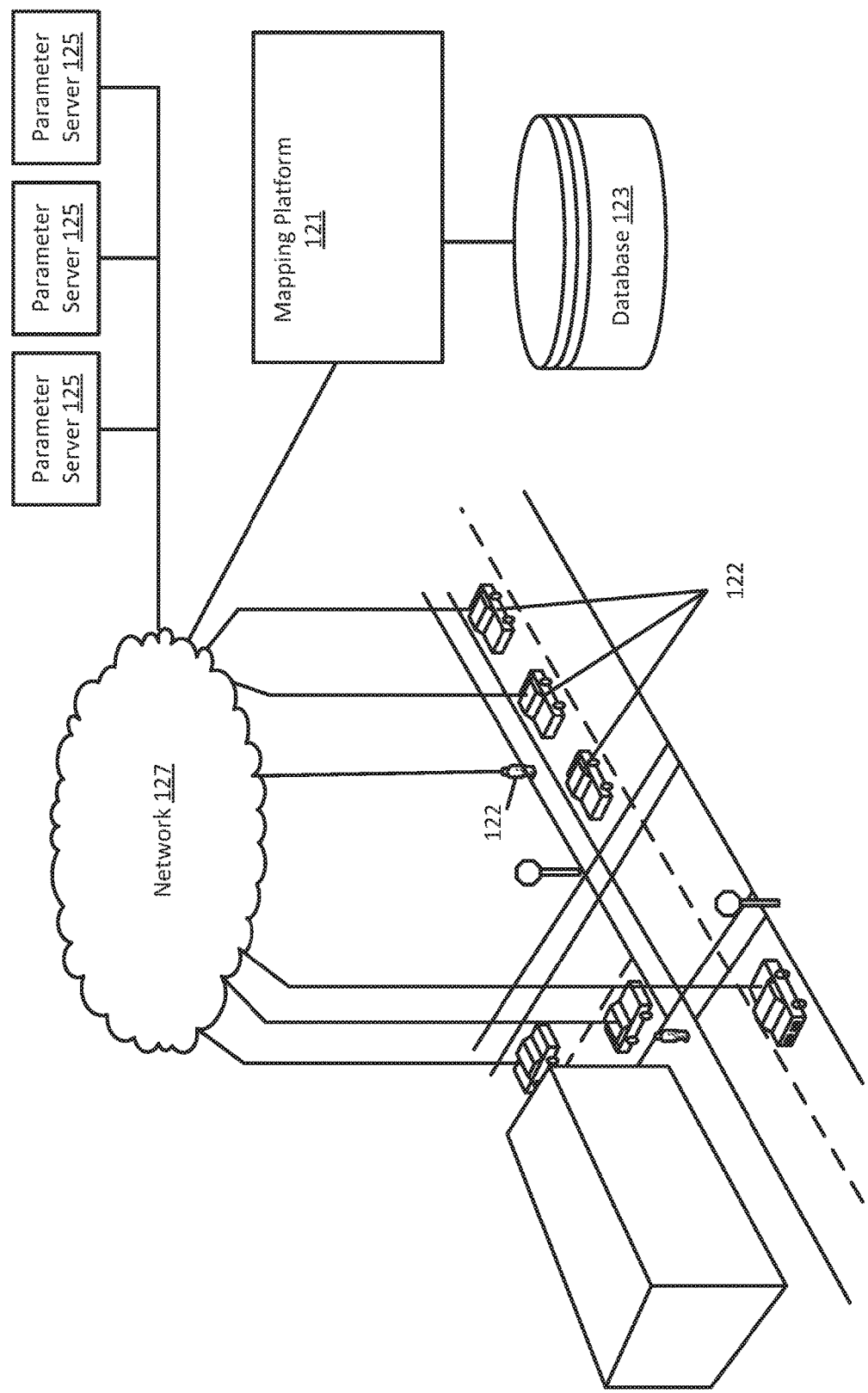
FIG. 1 depicts an example system for distributed asynchronous machine learning according to an embodiment.

Embodiments described herein provide systems and methods for training a machine learned model on a large number of devices. Each device acquires a local set of training data without sharing data sets across devices. The devices train the model on the respective device's set of training data. The devices communicate a parameter vector from the trained model asynchronously with a parameter server. The parameter server updates a master parameter vector and transmits the master parameter vector to the respective device. This process repeats multiple times, each device training the local model to determine a parameter vector, transmitting the parameter vector to the parameter server, receiving the updated master parameter vector, and retraining the local model.

Training of models, e.g. machine learned networks, requires a large amount of data. However, gathering and labeling this data may be prohibitive and expensive. Privacy concerns and bandwidth issues may not allow for gathering of such a large amount of data in a centralized location. As described here within, machine learning provides for devices to learn to iteratively identify a solution not known a priori or without being programmed explicitly to identify the solution. Machine learning uses two types of techniques: supervised learning, which trains a model on known input and output data so that the model may predict future outputs, and unsupervised learning, which finds hidden patterns or intrinsic structures in input data. Both techniques require large amounts of data to "learn" to generate an accurate output.

Supervised machine learning teaches a model using a large known (labeled) set of data. The training method takes the labeled set and trains a model to generate predictions for a response to new data. The model, in other words, is taught to recognize patterns (sometimes complex) in labeled data and then applies the patterns to new data. Different techniques may be used for supervised learning including, for example, classification, regression, and/or adversarial techniques.

Classification techniques predict discrete responses, for example, whether an email is genuine or spam, whether an image depicts a cat or dog, whether a tumor is cancerous or benign. Classification models classify input data into categories. Some applications of classification include object identification, medical imaging, speech recognition, and credit scoring. Classification techniques may be used on data that can be tagged, categorized, or separated into specific groups or classes. For example, applications for handwriting recognition and image recognition use classification to recognize letters and numbers. Classification techniques may use optimization methods such as gradient descent. Other optimization techniques may also be used. Common algorithms for performing classification include support vector machine (SVM), boosted and bagged decision trees, k-nearest neighbor, Naïve Bayes, linear discriminant analysis, logistic regression, and neural networks.

Regression techniques predict continuous responses, for example, changes in temperature or estimates for sales growth. Some applications of regression techniques include electricity load forecasting and algorithmic trading. Regression techniques may also use optimization methods such as gradient descent or other optimization methods. Common regression algorithms include linear model, nonlinear model, regularization, stepwise regression, boosted and bagged decision trees, neural networks, and adaptive neuro-fuzzy learning.

Adversarial techniques make use of two networks. One network is used to generate an output from a first set of data. The second network operates as a judge to identify if the output data is real or a forgery. Both networks are adjusted during the training process until the first network can generate outputs that, for example, indistinguishable from the real data. Alternative techniques may also be used to train a model.

Classification, regression, and adversarial techniques may be used to solve problems relating to navigation services. In an example of using classification for machine learning training, a method of object identification on the roadway involves capturing images as vehicles drive around. The images may be annotated to identify objects such as road markings, traffic signs, other vehicles, and pedestrians for example. The annotations/labels may be provided by a user or inferred by a user action (e.g. stopping at a stop light). Annotations/labels may also be derived from other sensor data (e.g. LIDAR sensor data used to label image data). The images are input into a large centralized neural network that is trained until the neural network reliably recognizes the relevant elements of the images and is able to accurately classify the objects. A large, disparate set of data is needed to train the neural network. The process of collecting the large data set of labeled objects may run into privacy, bandwidth, and timing issues.

In an embodiment, a machine learned (learnt) model may be trained using data from multiple worker devices without sharing data or complicated transmission and timing schemes. Each worker device collects data using a sensor on or about a vehicle. The data may be image data, video data, audio data, text data, personal data, weather data or other types of data. In an example of image data collection and object identification, certain objects in the images are labeled based on an existing model, manual annotation, or validation methods. For example, an object in an image may be labeled as a particular sign as the sign exists at the specified location in a high definition (HD) map database.

Using the labeled objects, each worker device may train a locally stored model using a classification technique. Parameters for the locally trained model are transmitted by each of the worker devices to a parameter server. Due to the disparate data sets and various methods of transmission, each worker may transmit the parameters asynchronously. Each worker device may, for example, transmit local parameters after training a copy of a local model on one hundred images (different metrics may be used). Since the worker devices are capturing different data, each worker device may reach one hundred images at different times. A first device finishes training and transmits the parameters to the parameter server. The parameter server updates a central set of parameters and transmits the updated central set of parameters back to the worker device. This process is repeated when each worker device asynchronously (e.g. by each device separately and independently) transmits the respective locally generated parameters. Certain workers devices may transmit local parameters multiple times before another worker transmits the respective local parameters. During the processes, the parameter server is constantly updating the central set of parameters and transmitting the updated set to the worker that transmitted the local parameters. As workers collect new data, the local models may be trained on the new data or a combination of the new and old data. Over time, the transmitted parameters back and forth between the workers and the parameter server eventually settles on a final set of parameters. The final set of parameters and the model may then be used by the worker or other devices to accurately identify objects that the devices encounter on the roadway. Other types of models may be trained using the distributed network of devices.

In an embodiment, systems and methods are provided for training a model using a gradient descent process on a large number of devices with each device holding a respective piece of training data without sharing data sets. Training using an optimization method such as gradient descent includes determining how close the model estimates the target function. The determination may be calculated a number of different ways that may be specific to the particular model being trained. The cost function involves evaluating the parameters in the machine learning model by calculating a prediction for the model for each training instance in the dataset and comparing the predictions to the actual output values and calculating an average error value (such as a value of squared residuals or SSR in the case of linear regression). In a simple example of linear regression, a line is fit to a set of points. An error function (also called a cost function) is defined that measures how good (accurate) a given line is. In an example, the function inputs the points and return an error value based on how well the line fits the data. To compute the error for a given line, in this example, each point (x, y) is iterated in the data set and the sum the square distances between each point's y value and the candidate line's y value is calculated as the error function.

Gradient descent is used to minimize the error functions. Given a function defined by a set of parameters, gradient descent starts with an initial set of parameter values and iteratively moves toward a set of parameter values that minimize the function. The iterative minimization is based on a function that takes steps in the negative direction of the function gradient. A search for minimizing parameters starts at any point and allows the gradient descent algorithm to proceed downhill on the error function towards a best outcome. Each iteration updates the parameters that yield a slightly different error than the previous iteration. A learning rate variable is defined that controls how large of a step that is taken downhill during each iteration.

For image processing and computer vision models, unsupervised learning techniques may also be used for object detection and image segmentation. Unsupervised learning identifies hidden patterns or intrinsic structures in the data. Unsupervised learning is used to draw inferences from the datasets that include input data without labeled responses. One example of unsupervised learning technique is clustering. Clustering may be used to identify patterns or groupings in data. Applications for cluster analysis may include, for example, gene sequence analysis, market research, and object recognition. Common algorithms for performing clustering include k-means and k-medoids, hierarchical clustering, Gaussian mixture models, hidden Markov models, self-organizing maps, fuzzy c-means clustering, and subtractive clustering. In an embodiment, systems and methods are provided for training an unsupervised machine learned network on a large number of devices with each device holding its own piece of training data without sharing data sets.

Unsupervised learning algorithms lack individual target variables and instead have the goal of characterizing a data set in general. Unsupervised machine learning algorithms are often used to group (cluster) data sets, e.g., to identify relationships between individual data points (that may include of any number of attributes) and group them into clusters. In certain cases, the output from unsupervised machine learning algorithms may be used as an input for supervised methods. Examples of unsupervised learning include image recognition, forming groups of data based on demographic data, or clustering time series to group millions of time series from sensors into groups that were previously not obvious.

One problem with training machine learned network is procuring a data set on which to train the network. The output of a machine learned network may not be accurate if the data on which the network is trained on is flawed or limited in scope. Collecting a large amount of disparate data may be curtailed by privacy and transmission concerns. In the example of object recognition on a roadway, users may be hesitant to provide personal and local data in mass. Further, raw image data may be massive and as such difficult to share across a network. Once collected, the data must be processed, required both time and resources.

One solution is to process the data at the devices that collect the data. In order to facilitate the processing, different methods may be used. One method shares data across devices. Data may be transmitted to a central repository. The data or a model may be transmitted back to the edge devices. This method still includes privacy and transmission issues. Additionally, the data may be evenly distributed to accelerate the training. For example, by allocating the same amount or types of data to each device, the devices may finish processing the data at or about the same time allowing a centralized server to capture the results at the same time. A centralized server may balance data between devices.

Another solution includes waiting for a certain fraction of devices to return before aggregating the learning parameters. Then all the workers are updated based on the aggregated parameters from a subset of nodes. One problem with this solution is that it may depend on having viable bandwidth. The number of devices is also required to specified ahead of time and the loss or delay of one device may interrupt the learning process. For example, if one or more devices are delayed, the entire process may also have to wait. Each of these methods has drawbacks as described above. Privacy issues may prohibit transfer of data. Transmission bottlenecks may prohibit or slow transmission to a central repository.

Embodiments provide for distributed processing of data while maintaining privacy and transmission concerns. In an embodiment, all the data remains on the edge devices to satisfy privacy concerns. No data is available centrally to train the model. The ratio of data points to devices may be relatively small resulting in the data on each device being non-independently and identically distributed data (non-I.I.D.) (devices have only a subset of data types) and unbalanced (devices have different orders of magnitude of data). The training occurs in a decentralized manner on multiple devices with only the local data available to each device. The multiple devices do not share data. The aggregation of model parameters occurs asynchronously on a centralized parameter server. The aggregation of the model parameters includes a small linear weighting of the locally-trained model parameters to the centrally-stored model parameters that is independent of the number of data points, the staleness of the parameter updates, and the data distribution (e.g. unbalanced non-I.I.D.).

FIG. 1 depicts a decentralized system for training a machine learned model. The system includes a plurality of devices 122, a network 127, parameter servers 125, and a mapping platform 121. The mapping platform 121 may include or may be connected to a database 123 (also referred to as a geographic database or map database or HD mapping database or HD map). The mapping platform 121 may include one or more servers 125. Additional, different, or fewer components may be included.

The system includes devices 122 (also referred to as edge devices or worker devices 122). The devices may include probe devices, probe sensors, or other devices 122 such as personal navigation devices 122, location aware devices, smart phones mount on a vehicle, or connected vehicles among other devices. The devices 122 communicate with one another using the network 127. Each device 122 may execute software configured to train a model. Each device 122 may collect and/or store data relating to the model. The data for each device 122 is not independently and identically distributed (non-I.I.D.). The distribution of data on two given devices might be quite different. The data for each device 122 is also unbalanced. The amount of data on two given devices includes different magnitudes of training data points.

The plurality of devices 122 may include probe devices, probe sensors, or other devices 122 such as personal navigation devices 122 or connected vehicles. The device 122 may be a navigation system built into the vehicle and configured to monitor the status of the vehicle. The devices 122 may include mobile phones running specialized applications that collect data as the devices 122 are carried by persons or things traveling the roadway system. The devices 122 may be configured to collect and transmit data including the status of a vehicle. The devices 122 may be configured to monitor conditions near the vehicle. The devices 122 may be configured to provide guidance for a user or vehicle.

The devices 122 may use different sensors such as cameras, light detection and ranging (LIDAR), radar, ultrasonic, or other sensors. Different types of data may be collected by a device 122, for example, image data, weather data, vehicular data, audio data, personal data, among others. For example, image data relating to roadways may be collected that represents features such as road lanes, road edges, shoulders, dividers, traffic signals, signage, paint markings, poles, and all other critical data needed for the safe navigation of roadways and intersections.

Each of the devices 122 may store a copy of a portion of a geographic database 123 or a full geographic database 123. The geographic database 123 may include data for HD mapping. An HD map or HD map data may be provided to the devices 122 as a cloud-based service. The HD map may include one or more layers. Each layer may offer an additional level of detail for accurate and relevant support to connected and autonomous vehicles. The layers may include, for example, a road model, a lane model, and a localization model. The road model provides global coverage for vehicles to identify local insights beyond the range of the vehicle's onboard sensors such as high-occupancy vehicle lanes, or country-specific road classification. The lane model may provide more precise, lane-level detail such as lane direction of travel, lane type, lane boundary, and lane marking types, to help self-driving vehicles make safer and more comfortable driving decisions. The localization layer provides support for the vehicle to localize the vehicle in the world by using roadside objects like guard rails, walls, signs and pole like objects. The vehicle identifies an object, then uses the object's location to measure backwards and calculate exactly where the vehicle is located.

Each of the device 122 may store a model (e.g. machine-learned network) that is trained by a large number (hundreds, thousands, millions, etc.) of devices 122 with each device 122 holding a set of training data without sharing data sets. Each device 122 may be configured to training a pre-agreed model with gradient descent learning for a respective piece of training data, only sharing learnt parameters of the model with the rest of the network. The device 122 is configured to acquire different training data from other devices that are training the model. In addition, at least one transmission between the device and a parameter server occurs asynchronously with respect to the other devices that are training the model. The devices 122 may include an HID map that is used to navigate or provide navigational services. The devices 122 may also include sensors that capture, for example, image data of features or object on the roadway. As a device 122 traverses a roadway, the device 122 may encounter multiple objects such as other vehicles, cyclists, pedestrians, etc. The device 122 may use the stored model to identify a position of the vehicle, or the identity of the objects. Based on the identification, the device 122 may provide navigation instructions or may provide commands for a vehicle to perform an action.

One or more devices 122 or the mapping platform 127 may be configured as a parameter server 125. The parameter server 125 may also be configured distinct from the devices 122 or mapping platform 127. The system may include one or more parameter servers 125. The parameter servers 125 are configured to receive locally trained model parameters from a device 122, adjust centrally stored model parameters, and transmit the adjusted centrally model parameters back to the device. The parameter server 125 communicates with each device 122 of the plurality of devices 122 that are assigned to the parameter server 125. The parameter servers 125 may be configured to aggregate parameters from one or more models that are trained on the devices 122. The parameter servers 125 may be configured to communicate with devices that are located in a same or similar region as the parameter server 125. One or more parameter servers 125 may communicate with one another. The parameter server 125 is configured to communicate asynchronously with the plurality of devices 122. When a device 122 transmits a set of locally trained model parameters, the parameter server 125 adjusts the central model parameters and transmits the adjusted centrally model parameters back to that device. If, for example, two different devices transmit locally trained model parameters, the parameter server will perform the adjustment twice, e.g. a first time for the first device that transmitted locally trained model parameters and then a second time for the second device. The parameter server does not wait to batch results or average incoming trained model parameters. Communications between the devices 122 and the parameter server are one to one and serial, not depending on other communication with other devices. Asynchronous communication is the exchange of messages between the device and the parameter server responding as schedules permit rather than according to a clock or an event. Communications between each device 122 and parameter server may occur intermittently rather than in a steady stream.

In an embodiment, one or more parameter servers 125 may be configured as a master parameter server. The master parameter server may be configured to communicate with a plurality of parameter servers; the master parameter server configured to receive central parameters from the plurality of parameter servers; the master parameter server configured to calculate and transmit, in response to a communication from the parameter servers of the plurality of parameter servers, a set of global central parameters to a respective parameter server from which the communication originated. In an embodiment, the master parameter server is configured to communicate with both the plurality of parameter servers and the plurality of worker devices.

The parameter server 125 stores a central parameter vector that the parameter server 125 updates each time a device (worker unit) sends a parameter vector to the parameter server 125. A parameter vector may be a collection (e.g. set) of parameters from the model or a representation of the set of parameters. The parameter vector may be a randomly chosen components of a parameter vector. Models may include thousands or millions of parameters. Compressing the set of parameters into a parameter vector may be more efficient for bandwidth and timing than transmitting and recalculating each parameter of the set of parameters. A parameter vector may also be further compressed. In an embodiment, an incoming parameter vector I may also be compressed into a sparse subspace vector. For example, if I=($i\_1$, $i\_2$, $i\_3$, . . . , $i\_n$), the incoming parameter vector I may be compressed into I'=($i\_b1$, $i\_b2$, . . . , $i\_bm$) prior to transmission where m is smaller than n. After receiving I', at the parameter server, I" may be uncompressed into I"=(0, 0, . . . , $i\_b1$, 0, . . . , 0, $i\_b2$, . . . , $i\_bm$, 0, . . . ) which is then used as the incoming parameter vector I in Equation 1 described below.

In an embodiment, the update is done using the following equation:

$$N = (1-\alpha)*O + \alpha*I \quad \text{EQUATION 1:}$$

where N=the new central parameter vector;
O=the old (current) central parameter vector;
I=the incoming parameter vector;
Alpha (α)=a fixed real number between 0 and 1;
* denotes the scalar multiplication; and
+ denotes vector addition.

The value of alpha may be adjusted automatically or manually depending on the type of training, the expected number of iterations, and the number of devices. The value of alpha may be changed dynamically during the training process. A lower alpha value discounts the newer incoming parameter, leading to less change in the central parameter vector. A higher alpha value allows for the incoming parameters vectors to quickly change the central parameter vector. The value of alpha may be calculated or set manually or automatically. The update may also use different functions to calculate the new central parameter vector. The new central parameter vector may be calculating using, for example, linear interpolation.

In an embodiment, the parameter server 125 further communicates with other parameter servers 125. A master parameter server, for example, may aggregate model parameters from multiple first level parameter servers. The system may be configured with multiple levels of aggregation. Similar to receiving locally trained model parameters, each parameter server transmits trained model parameters to the master parameter server and received back master trained model parameters.

In an embodiment, the devices 122 further provide navigation services to an end user or generate commands for vehicular operation. The devices 122 may communicate with the mapping platform 127 through the network 129. The devices 122 may use trained models (using received parameters) to provide data to assist in identifying a location of the device 122, objects in the vicinity of the device 122, or environmental conditions around the device for example.

To provide navigation services, the devices 122 may further receive data from the mapping platform 121. The mapping platform 121 may also receive data from one or more systems or services that may be used to identify the location of a vehicle, roadway features, or roadway conditions. The device 122 may be configured to acquire and transmit map content data on the roadway network to the mapping platform 121. As depicted in FIG. 1, the device 122 may be configured to acquire sensor data of a roadway feature and the location of the roadway feature (approximation using positional circuitry or image processing). The device 122 may be configured to identify objects or features in the sensor data using one or more machine leant models. The device 122 may be configured to identify the device's location using one or more machine learned models. The one or more machine learned models may be trained on multiple distributed devices on locally stored data that is not shared between the devices. The identified objects or features may be transmitted to the mapping platform 121 for storage in a geographic database 123. The geographic database 123 may be used to provide navigation services to the plurality of devices 122 and other users.

The mapping platform 121, parameter server 125, and devices 122 are connected to the network 127. The devices 122 may receive or transmit data through the network 127 to the other devices 122 or the mapping platform 127. The mapping platform 121 may receive or transmit data through the network 127. The mapping platform 121 may also transmit paths, routes, or feature data through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, DSRC (otherwise known as WAVE, ITS-G5, or 802.11p and future generations thereof), a 5G wireless network, or wireless short-range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

Figure 2:
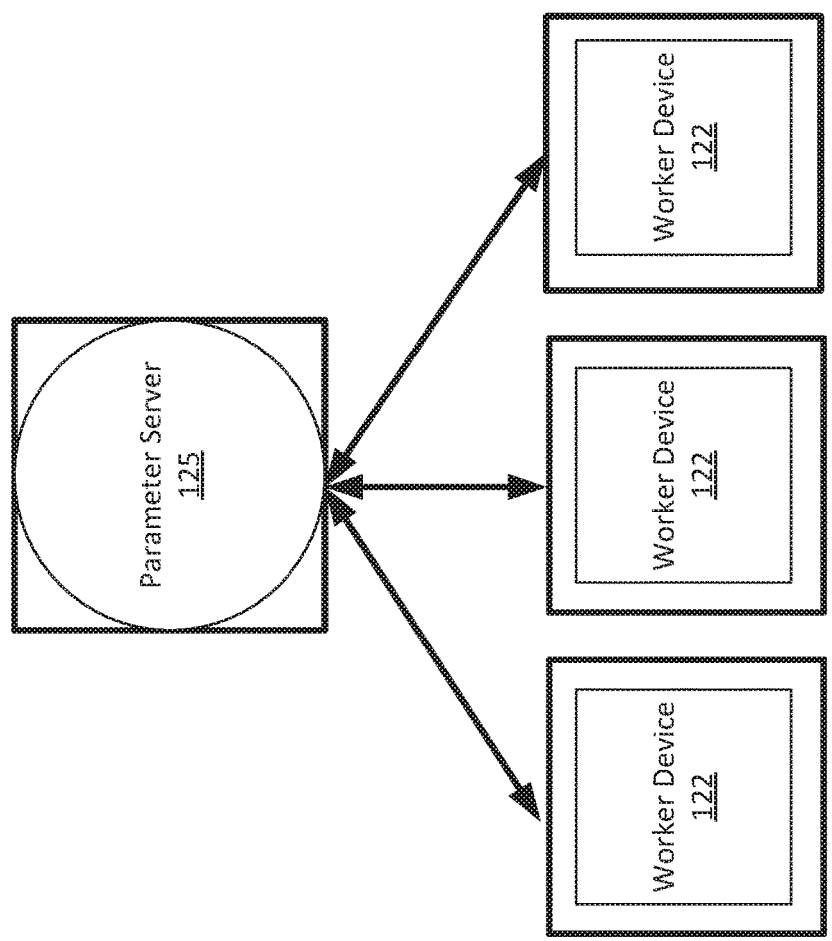
FIG. 2 depicts an example system for distributed asynchronous machine learning according to an embodiment.

FIG. 2 depicts an example of a system for training a machine learned model using a plurality of devices. FIG. 2 include three devices that are configured as worker devices 122 and one device that is configured as a parameter server 125. Each of the three worker devices 122 include at least one sensor configured to acquire and store training data. The three worker devices 122 communicate with the parameter server 125 using a communication interface. The parameter server 125 aggregates the parameter vectors from each of the three devices and generates a central parameter vector. In an embodiment, the aggregation is done using equation 1 described above. During operation, the three worker devices 122 may each include a device processor configured to train a model using the training data. The device processor is further configured to transmit a parameter vector of the trained model to a parameter server 125. The device processor is further configured to receive an updated central parameter vector from the parameter server 125; the device processor further configured to retrain the model using the new central parameter vector. Each of the three devices acquires and stores different training data than other devices. Each of the devices communicates with the parameter server 125 asynchronously.

Figure 3:
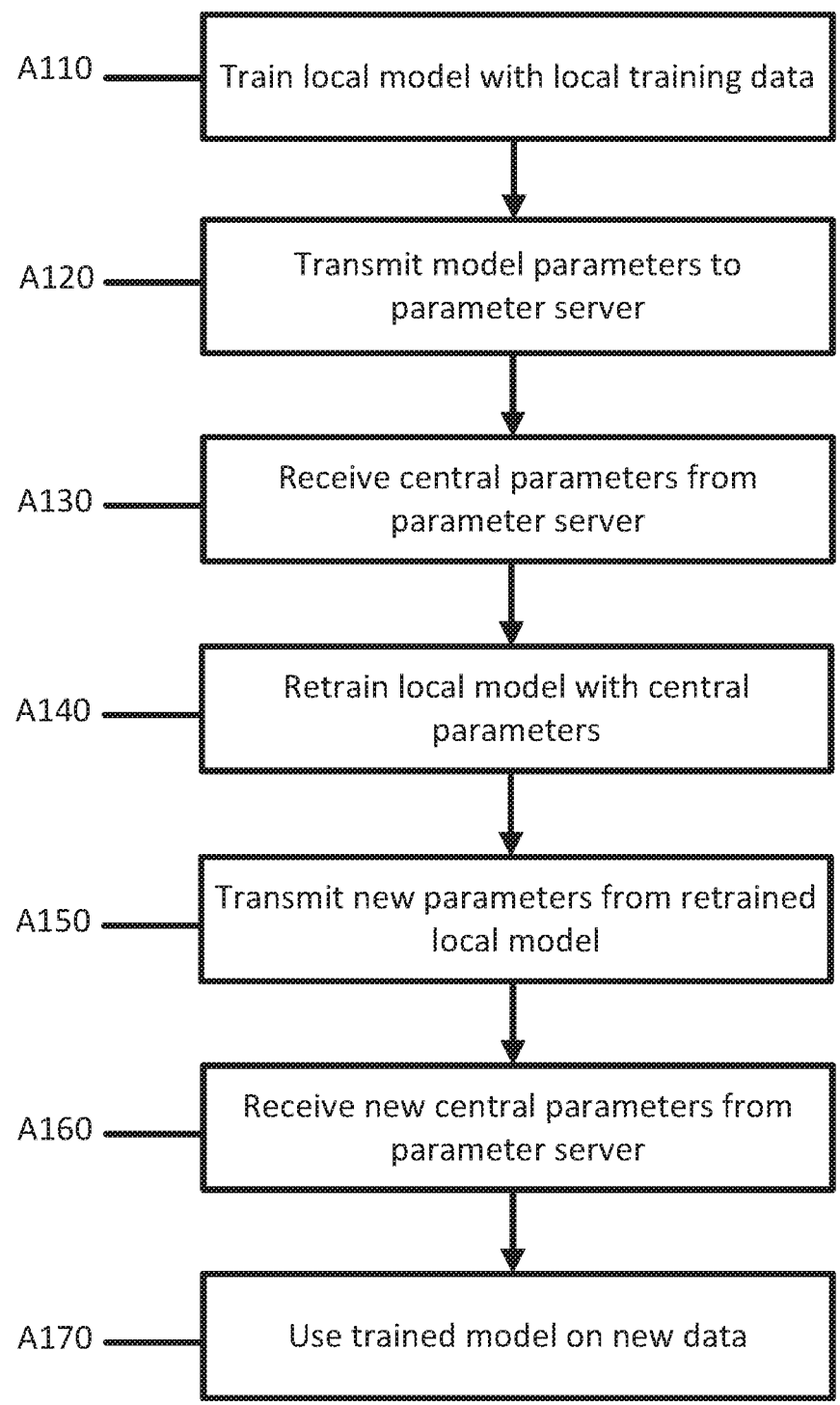
FIG. 3 depicts a workflow for distributed asynchronous machine learning according to an embodiment.

FIG. 3 depicts an example workflow for training a machine learned model using a plurality of distributed worker devices 122 such as depicted in FIG. 2. As presented in the following sections, the acts may be performed using any combination of the components indicated in FIG. 1, FIG. 2, or FIG. 7. The following acts may be performed by the device 122, the parameter server 125, the mapping system 121, or a combination thereof. Additional, different, or fewer acts may be provided. The acts are performed in the order shown or other orders. The acts may also be repeated. Certain acts may be skipped.

By using a plurality of distributed worker devices 122, the model is trained on a much larger volume of data on the edge than can be transferred to a centralized server for bandwidth, privacy, business, and timing reasons. The data, including any personal information, remains on the worker devices 122 and only the model parameters that encode low- and high-level concepts are shared centrally through a parameter server 125. Since the data stays on the worker devices 122, a reduced amount of data is needed to be transferred (e.g. image data/audio). Additionally, the model may be trained using a diverse set of data as certain data may not be easily transferred from the devices (for example, automotive sensor data). Finally, as the training occurs on the worker devices 122 maintained by third-parties, the cost to run the large models over huge datasets is at least partially borne by the users participating in the training process.

At act A110, a worker device 122 trains a model using local training data and a first parameter. The worker device 122 includes a model and local training data. The local training data may be data acquired from, for example, a sensor in communication with the worker device 122 (camera, LIDAR, microphone, keypad, etc.). The training data on each of the devices is not independently and identically distributed (non-I.I.D.). The distribution of data on two given devices is different and unbalanced (devices have different orders of magnitudes of training data points). In an example, for image data, one device may have several gigabytes of image data that relates to images taken while traversing a highway and another device may only have a few megabytes of image data acquired while traversing a rural road. Both sets of data may be useful to train an image recognition model even though the sets of data include images from two disparate areas and have magnitudes of difference in quantity. The quality of data may also differ between devices. Certain devices may include higher quality sensors or may include more storage for data allowing higher quality data to be captured.

In an embodiment, the training data is labeled. Labeled data is used for supervised learning. The model is trained by imputing known inputs and known outputs. Weights or parameters are adjusted until the model accurately matching the known inputs and output. In an example, to train a machine learned model to identify traffic signs using acquired image data, images of traffic signs—with a variety of configurations—are required as input variables. In this case, light conditions, angles, soiling, etc. are compiled as noise or blurring in the data as the model needs to be able to recognize, for example, a traffic sign in rainy conditions with the same accuracy as when the sun is shining. The labels, the correct designations, for such data may be assigned manually or automatically. The correct set of input variables and the correct classifications constitute the training data set.

Labels may be provided by, for example, requesting additional input from a user (requesting a manual annotation), derived from additional data (parsing textual descriptions), or by incorporating additional data from other sensors. In an example, for a model that identifies location based from image data, the labels for the training set may be provided by a global positioning system (GPS) or positional sensor. The model may be used in situations where the GPS sensor is unreliable or in addition to the GPS sensor. In this scenario, for the training data, the GPS or positional sensor may be more accurate than locating by image recognition. Another example includes training an optical camera to recognize depth using LIDAR as the ground truth, so that the optical camera may recognize depth in cars without LIDAR.

Other methods for labeling data may be used, for example, a cloud-based service may give accurate, albeit incomplete, labels that be downloaded from the cloud to the edge. Delayed user interactions may also provide the label. For example, if a model is attempting to recognize whether a stop sign exists a certain intersection, then the behavior of the driver (whether the driver stops at the intersection) may be used to generate a label for the data.

In an embodiment, the training data is labeled, and the model is taught using a supervised learning process. A supervised learning process may be used to predict numerical values (regression) and for classification purposes (predicting the appropriate class). A supervised learning processing may include processing images, audio files, videos, numerical data, and text among other types of data. Classification examples include object recognition (traffic signs, objects in front of a vehicle, etc.), face recognition, credit risk assessment, voice recognition, and customer churn, among others. Regression examples include determining continuous numerical values on the basis of multiple (sometimes hundreds or thousands) input variables, such as a self-driving car calculating the car's ideal speed on the basis of road and ambient conditions.

The model may be any model that is trained using a machine learned process. The model may include machine learned processes such as support vector machine (SVM), boosted and bagged decision trees, k-nearest neighbor, Naïve Bayes, discriminant analysis, logistic regression, and neural networks. In an example, a two-stage convolutional neural network is used that includes max pooling layers. The two-stage convolutional neural network (CNN) uses rectified linear units for the non-linearity and a fully-connected layer at the end for image classification.

In an embodiment, the model may be trained using an adversarial training process, e.g. the model may include a generative adversarial network (GAN). For an adversarial training approach, a generative network and a discriminative network are provided for training by the devices. The generative network is trained to identify the features of data in one domain A and transform the data from domain A into data that is indistinguishable from data in domain B. In the training process, the discriminative network plays the role of a judge to score how likely the transformed data from domain A is similar to the data of domain B, e.g. if the data is a forgery or real data from domain B.

In an embodiment, the model is trained using a gradient descent technique or a stochastic gradient descent technique. Both techniques attempt to minimize an error function defined for the model. For training (minimizing the error function), a worker device 122 first connects to the parameter server 125. The worker device 122 may start with randomly initialized model parameters or may request initial model parameters from the parameter server 125. The starting parameters may also be derived from another, pretrained model rather than being randomly initialized. The initial parameters may be assigned to all subsequent edge nodes. Alternatively, updated central parameters may be assigned if the training process has already begun. In an example, worker devices 122 may initially communicate with the parameter server 125 at different times. A first device may communicate with the parameter server 125 and be assigned randomly initialized model parameters. Similarly, a second device may communicate shortly thereafter with the parameter server 125 and be assigned randomly initialized model parameters. At some point, devices may begin transmitting local parameters back to the parameter server 125. The parameter updates the central parameters and transmits the central parameters back to the respective device. Any device that first communicates with the parameter server 125 after this time may be assigned the central parameters and not the randomly initialized model parameters. In this way, new devices may be added to the system at any point during the training process without disrupting the training process. Handing out the latest parameters to newly joined edge nodes may result in faster learning at early stages.

The gradient descent technique attempts to minimize an error function for the model. Each device trains a local model using local training data. Training the model involves adjusting internal weights or parameters of the local model until the local model is able to accurately predict the correct outcome given a newly input data point. The result of the training process is a model that includes one or more local parameters that minimize the errors of the function given the local training data. The one or more local parameters may be represented as a parameter vector. As the local training data is limited the trained model may not be very accurate when predicting the result of an unidentified input data point. The trained model, however, may be trained to be more accurate given starting parameters that cover a wider swath of data. Better starting parameters may be acquired from the parameter server 125.

Referring back to FIG. 3, at act A120, the worker device 122 transmits a second parameter from the trained model to the parameter server 125. The second parameter may be parameter vector that is generated as a result of training the model using the training data. In an embodiment, the worker device 122 may transmit a set of parameters from the model. A gradient, may for example, include thousands or millions of parameters. The set of parameters may be transmitted or compressed in to, for example, a parameter vector that is transmitted to the parameter server 125. In an embodiment, the second parameter set may be a randomly chosen subset of parameters or parameter vectors. The subset may also be, for example, the second parameter set encoded using a sparsely encoding scheme.

At act A130, the worker device 122 receives a third parameter from the parameter server 125. In an embodiment, the parameter server 125 stores a central parameter vector that the parameter server 125 updates each time a worker unit sends it a local parameter or local parameter vector. The parameter server 125 using a weighting function and a weight (Alpha) so that newly received local parameter vectors do not overwhelm the central parameter vector. In an embodiment, the parameter server 125 updates the central parameter using equation 1 described above. The updated central parameter may be transmitted to the device prior to the updated central parameter being altered again by, for example, another device requesting a new central parameter. The updating of the central parameter set by one device may also be decoupled from that same device getting back an update. For example, the device may send an updated local parameter set, and then immediately get back the latest central parameters from the parameter server, without the central parameter set having been updated (yet) by the device's local parameters.

The Alpha value may be assigned or adjusted manually depending on the type of model, number of device, and amount of data. The Alpha value may be assigned initially and adjust over time or may be static for the entirety of the training process. One method for setting an initial Alpha value is to use a set of test device and benchmark databases. For example, two benchmark datasets that may be used to identify an Alpha value include the Modified National Institute of Standards and Technology database (MNIST) digit recognition dataset and the Canadian Institute for Advanced Research (CIFAR-10) dataset. Both datasets may be distributed with un-even distribution of data, both in terms of the data labels (restricted to several data labels per node, overlapping and non-overlapping) and the quantity of data (different orders of magnitude between nodes, with some less than the batch size). The test training process may be run on the test devices to identify an Alpha value that is correct for the training process given time, bandwidth, and data volume constraints. A test training process may also identify a quality of the model. One method for testing is to sample training data from devices (e.g. randomly select a training data point from a device before it is every used and then remove it from the training data set) and aggregate the samples centrally. Due to privacy concerns, the testing may only be implemented with user acknowledgement. Another method is to locally keep a training and testing data set, e.g. randomly chosen for each data point and, for local training, only local training data is used. After each local training session (certain number of epochs, or other suitably defined iterations) the local test result may be sent to a global test aggregation server that aggregates the test results.

In an embodiment, the Alpha value is set between 0.01 and 0.2 indicating that new incoming parameters are discounted between 80% and 99% when generating the new central parameter vector. Alternative values of Alpha may be used for different processes or models.

At act A140, the worker device 122 retrains the model using the local training data and the third parameter. The worker device 122 may use the same local training data or may update the training data with newly collected sensor data. The training data may be weighted by age or may be cycled out by the device. For example, data older than a day, month, or year, may be retired and no longer used for training purposes. Data may also be removed or deleted by a user or automatically by the device. Additional data may be added to the training data set as the data is collected.

The model is trained similarly to the act A110. The difference for each iteration is a different starting point for one or more of the parameters in the model. The central parameter vector that is received may be different than the local parameter vector generated by the device in A110. At act A150, the worker device 122 transmits the fourth parameter of the updated trained model to the parameter server 125. At act A160, the worker device 122 receives a fifth parameter from the parameter server 125. The process repeats for a number of iteration until the parameters converge or a predetermined number of iteration is reached. This process may be repeated hundreds or thousands of times. In an example, several thousand (e.g. 3,000 to 5,000) iterations may be performed. Depending on the complexity of the model and the type and quantity of devices and data, more or fewer iterations may be performed. If new data is added to the training data, the device may retrain the model and request a new central parameter (and the process may be fully or partially repeated).

The result of the training process is a model that may be able to accurately predict the classification given an unlabeled input. At act A170, the model is used on new data to generate, for example, a prediction or classification. In an example, for an image classification model, the worker device 122 identifies an object using the machine learned model and the fifth parameter.

In an embodiment, an asynchronous learning scheme is provided to train a model on devices where the data is unbalanced, non-I.I.D, and cannot be shared between devices. In one embodiment, a central parameter server 125 receives parameters updates from devices, updates the latest central parameter state by linear interpolation and then, in turn, immediately transmits the latest central parameters to the device. The device in question then continues the training regime starting from this new updated parameter set.

FIG. 2, as described above, depicts three worker devices 122 and a parameter server 125 that may be used for an asynchronous learning scheme. The three worker devices 122 and parameter servers 125 may be any type of device, for example, the device (both worker and parameter server) may be smartphones, navigation devices, vehicle systems, etc. Each of the worker devices 122 may include a sensor or input interface that collects data. Example of sensors may include a camera, LIDAR, radar, microphone, etc. Input interfaces may include, for example, a keyboard or touchscreen. The worker devices 122 locally store data that acquired using the sensor or input interface. The worker devices 122 further store a machine learned model. The machine learn model may include any type of machine learned model.

In the embodiment of FIG. 2, worker units are all implemented as processes on distinct devices. Each worker unit is tasked with learning a computational graph model via gradient descent learning, as described above. A computational graph model includes a set of nodes where each node represents an operation to be performed. The graph model also includes a set of edges or connections between nodes that describe the data on which the operations is to be performed. Edges may include both carriers of data and also control function. A carrier of data describes, for example, where or how the output of one node becomes the input of another node. A control function provides a control function, for example, controlling IF an operation is to be implemented. In a computational graph model, embodiment, the parameter server 125 is represented by a process on another device housing the parameter update mechanism as described above. The local parameters each device sends are locally generated model parameters. A worker device first trains the locally stored model through gradient descent in a pre-arranged fashion (fixed or flexible number of epochs) and then sends the trained parameters to the device housing the process representing the parameter server 125. The parameter server 125 calculates an updated parameter and immediately sends the updated parameter back to the respective device. The parameter server 125 does not wait for additional devices to respond. Upon receipt of the updated parameters, the process representing that worker unit continues its training of the model locally using local data.

Figure 4:
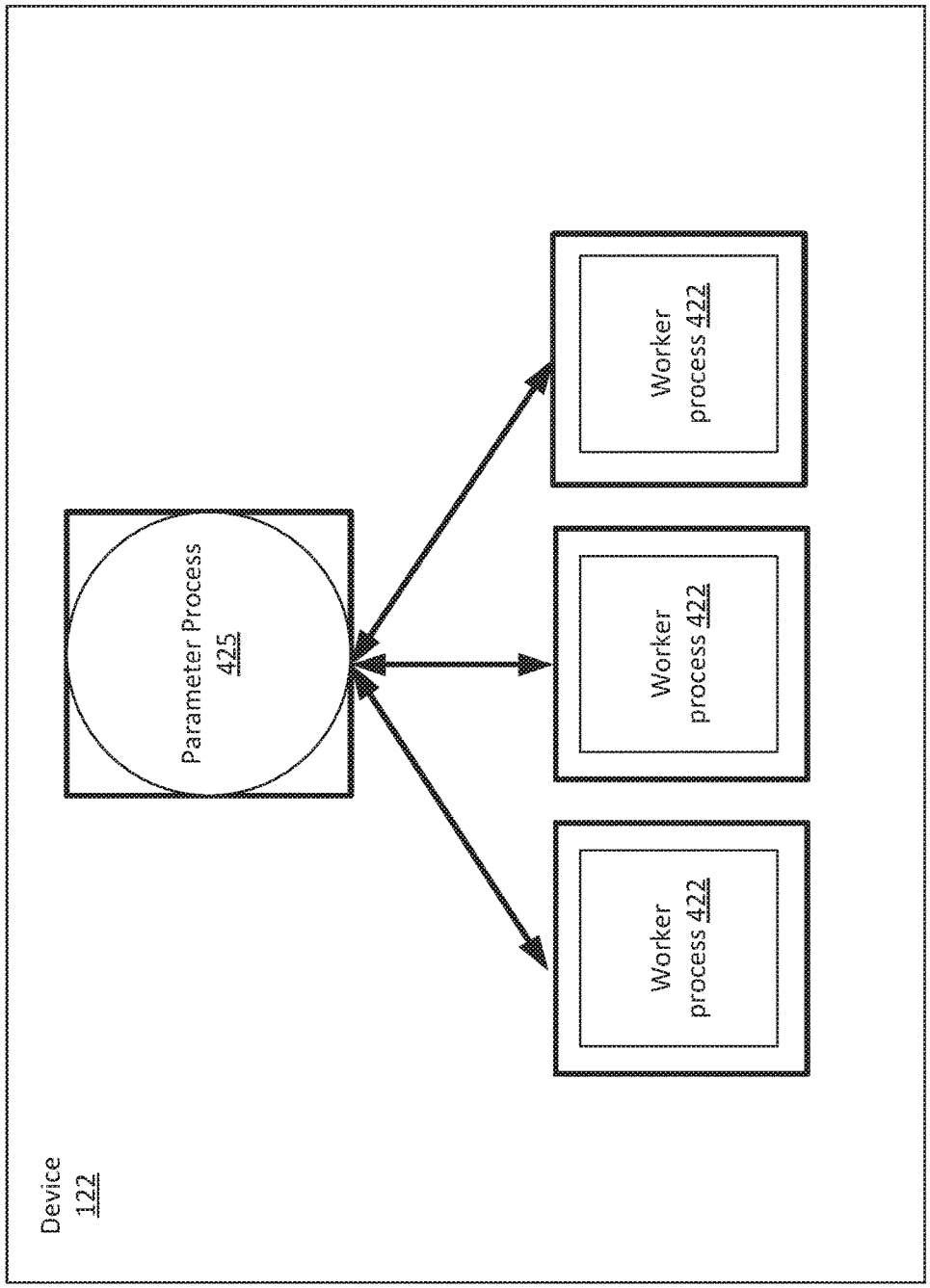
FIG. 4 depicts an example device for distributed asynchronous machine learning according to an embodiment.

In another embodiment, all units (devices and parameters server) are implemented as processes on one and the same device, communicating over internal endpoints, for example, provided by ports in the Transmission Control Protocol (TCP) protocol. FIG. 4 depicts an embodiment for parameter aggregation contained within a single device 122. The parameter server 125 is represented by a parameter process 425 that aggregates the central parameter vector as described and each of the one or more worker units is also represented by a worker process 422, each of which is tasked with learning a pre-agreed computational graph model with gradient descent learning. The parameter vectors sent are a fixed order of the model parameters of that computational graph model. Any worker unit process 422 first trains a local model on the data assigned to it. In some implementations, the data assigned to different such processes differs, in some other implementation certain processes share the pieces of data. Upon a pre-agreed set of rules (such as training said model for a precise number of epochs) each process representing a worker unit sends the parameter vector to the parameter process 425 representing the parameter server 125, which in turn will update the central parameter vector and return it to the sender in question. The process is repeated until the model is trained. The device 122 of FIG. 4 may further communicate with other devices 122 or parameter servers 125 to further aggregate the parameters.

Figure 5:
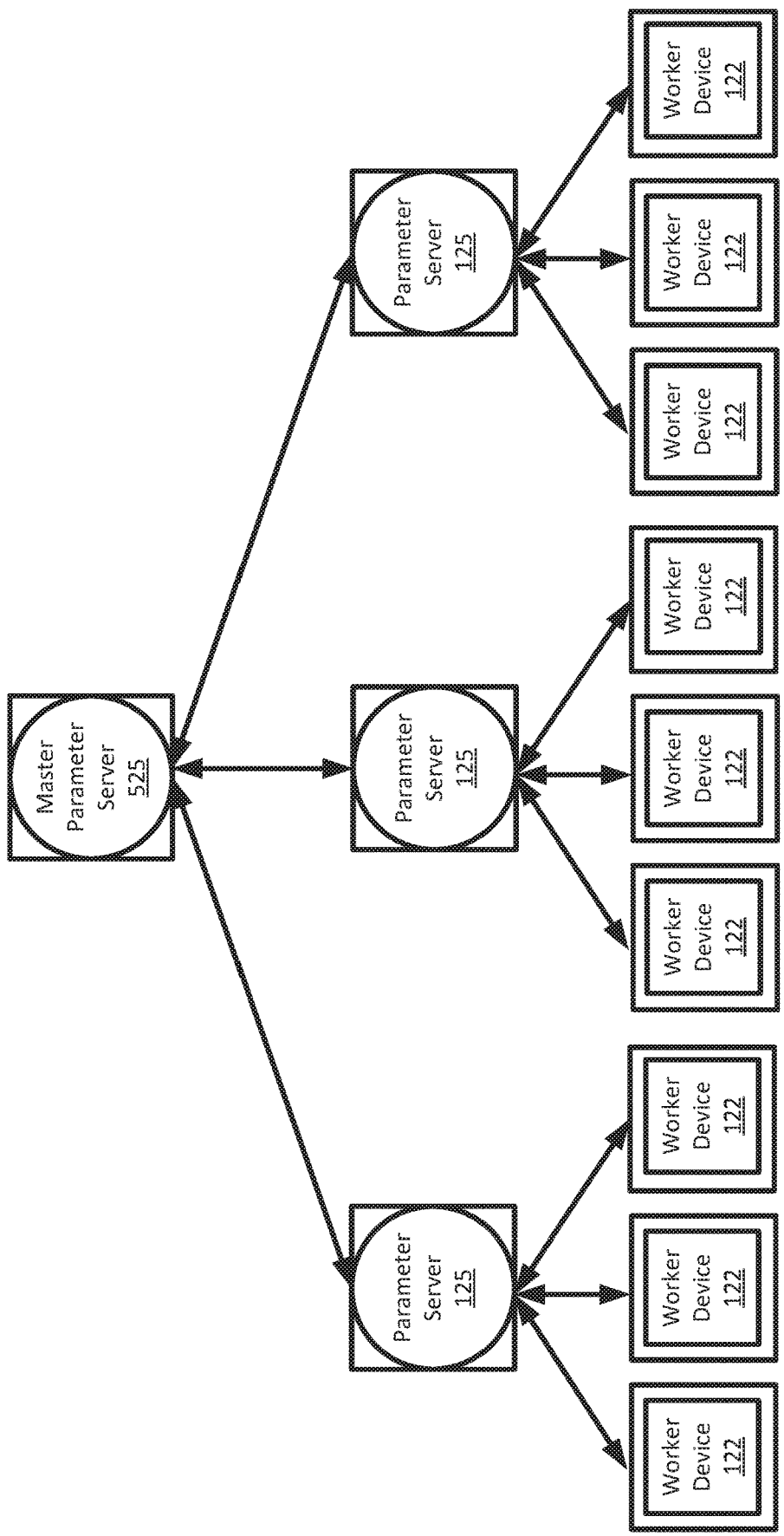
FIG. 5 depicts an example system for distributed asynchronous machine learning according to an embodiment.

In another embodiment, the system includes a set of devices that only house a single worker unit processes each, partitioned into groups, each of which communicating the respective parameters with a separate parameter server 125 process that is co-located with a process representing a worker unit on a separate device as described in the example above. FIG. 5 depicts an embodiment for aggregation by a hierarchy of parameters servers. There is not just a single parameter server 125, but the worker devices 122 and parameter servers 125 have been further partitioned into groups. Each parameter server 125 further transmits parameters to a master parameter server 525 to be aggregated.

Figure 6:
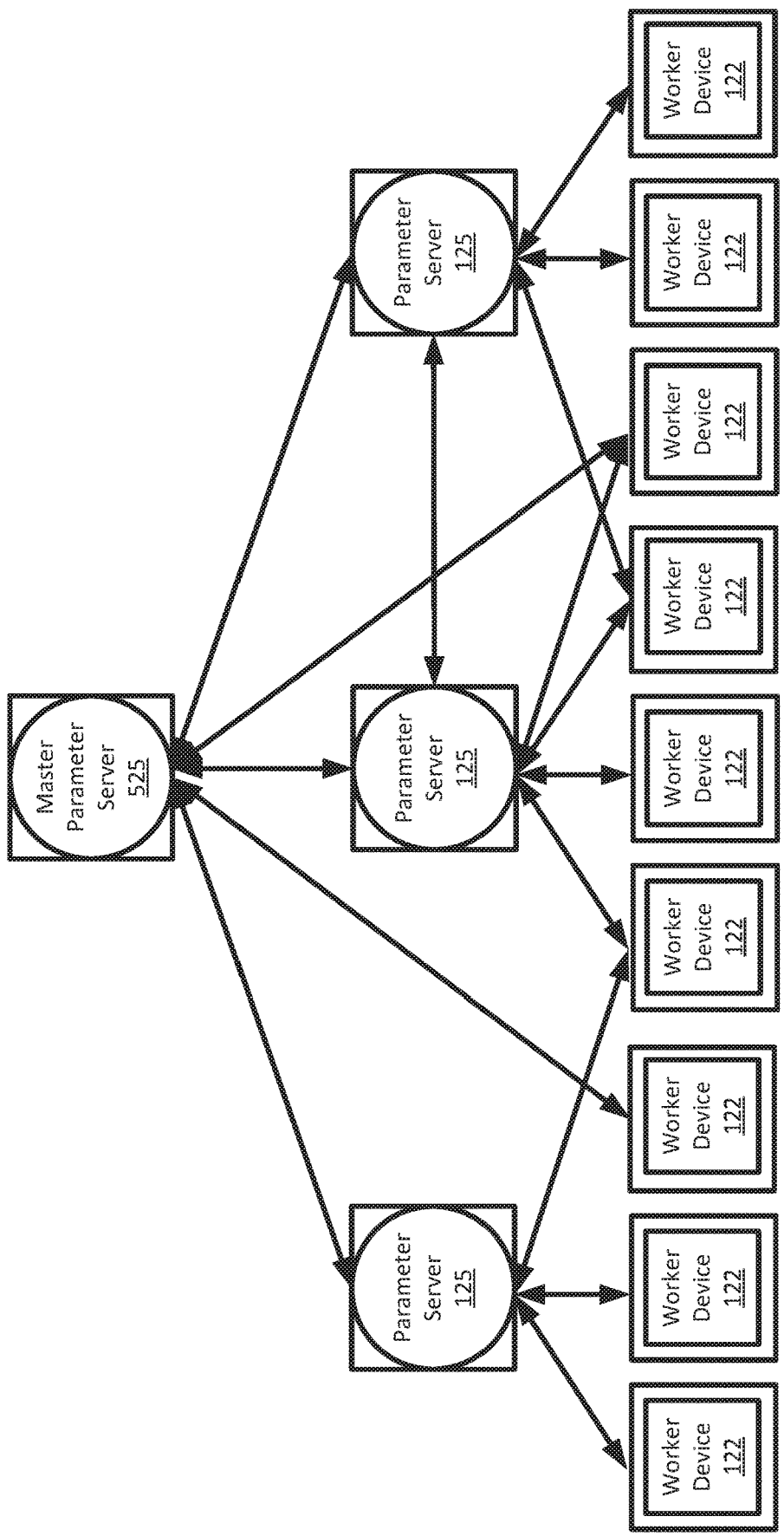
FIG. 6 depicts an example system for distributed asynchronous machine learning according to an embodiment.

In another embodiment, the parameter server 125 and worker devices 122 are established as separate devices as described above, but the arrangement is not hierarchical as in the last example but can use different connections and layouts. FIG. 6 depicts an example of non-hierarchal system. Each worker device 122, for example, may be able to communicate with different parameter servers 125. The parameter servers 125 may be located geographically or may only be able to handle a limited number of connections. Each parameter server 125 may only accept a predefined number of workers after which additional workers are turned away and directed to another parameter server 125. As in the above described example, the parameter servers 125 may communicate with higher level parameter servers and so on. A master parameter server 525 may communicate with worker devices 122. The parameter servers 125 may communicate with one another. Each component (worker device 122, parameter server 125, master parameter server 525) may be configured to function as either a worker or a parameter server 125.

Figure 7:
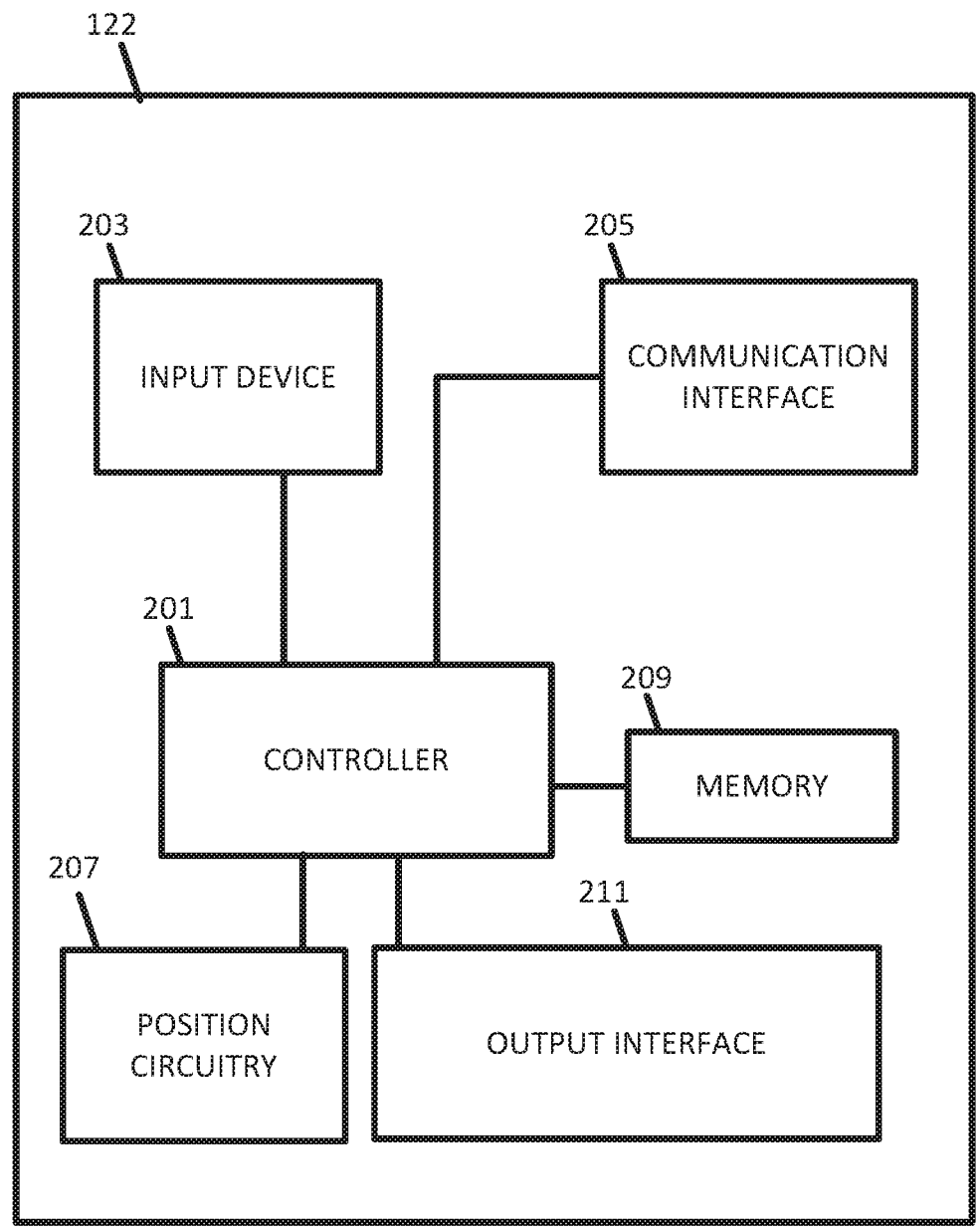
FIG. 7 depicts an example device of the system of FIG. 1 according to an embodiment.

FIG. 7 illustrates an example device 122 of the system of FIG. 1. The device 122 may be configured to collect, transmit, receive, process, or display data. The device 122 is configured to train a locally stored model using locally stored data in conjunction with other devices 122. The device 122 may also be referred to as a probe 122, a mobile device 122, a navigation device 122, or a location aware device 122. The navigation device 122 includes a controller 201, a memory 209, an input device 203, a communication interface 205, position circuitry 207, and an output interface 211. The output interface 211 may present visual or non-visual information such as audio information. Additional, different, or fewer components are possible for the mobile device 122. The navigation device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device 122, or the device 122 may be integrated into a vehicle. The device 122 may receive or collect data from one or more sensors in or on the vehicle.

The device 122 may be configured to execute routing algorithms using a geographic database 123 to determine an optimum route to travel along a road network from an origin location to a destination location in a geographic region. Using input from an end user, the device 122 examines potential routes between the origin location and the destination location to determine the optimum route in light of user preferences or parameters. The device 122 may then provide the end user with information about the optimum route in the form of guidance that identifies the maneuvers required to be taken by the end user to travel from the origin to the destination location. Some devices 122 show detailed maps on displays outlining the route, the types of maneuvers to be taken at various locations along the route, locations of certain types of features, and so on.

The device 122 is configured to identify a starting location and a destination. The starting location and destination may be identified though the input device 203. The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen that may be capacitive or resistive. The output interface 211 may be a liquid crystal display (LCD) panel, light emitting diode (LED) screen, thin film transistor screen, or another type of display. The output interface 211 may also include audio capabilities, or speakers.

A positional point may be identified using positional circuitry such as GPS or other positional inputs. The positioning circuitry 207, which is an example of a positioning system, is configured to determine a geographic position of the device 122. In an embodiment, components as described herein with respect to the navigation device 122 may be implemented as a static device. The navigation device 122 may identify a position as the device travels along a route using the positional circuitry. For indoor spaces without GPS signals, the navigation device 122 may rely on other geolocations methods such as LIDAR, radar, Wi-Fi, beacons, landmark identification, inertial navigation (dead reckoning), among others.

The device 122 may be configured to acquire data from one or more sensors (not shown). The device 122 may use different sensors such as cameras, microphones, LIDAR, radar, ultrasonic, or other sensors to acquire video, image, text, audio, or other types of data. The acquired data may be used for training one or more models stored on the device 122.

The device 122 may store one or more models in memory 209. The device 122 may be configured to train the model using locally acquired data and store model parameters in the memory 209. The memory 209 may be a volatile memory or a non-volatile memory. The memory 209 may include one or more of a read only memory (ROM), random access memory (RAM), a flash memory, an electronic erasable program read only memory (EEPROM), or other type of memory. The memory 209 may be removable from the mobile device 122, such as a secure digital (SD) memory card. The memory may contain a locally stored geographic database 123 or link node routing graph. The locally stored geographic database 123 may be a copy of the geographic database 123 or may include a smaller piece. The locally stored geographic database 123 may use the same formatting and scheme as the geographic database 123. The navigation device 122 may determine a route or path from a received or locally geographic database 123 using the controller 201. The controller 201 may include a general processor, a graphical processing unit (GPU), a digital signal processor, an application specific integrated circuit (ASIC), field programmable gate array (FPGA), analog circuit, digital circuit, combinations thereof, or other now known or later developed processor. The controller 201 may be a single device or combinations of devices, such as associated with a network, distributed processing, or cloud computing. The controller 201 may also include a decoder used to decode roadway messages and roadway locations.

The communication interface 205 may include any operable connection. An operable connection may be one in which signals, physical communications, and/or logical communications may be sent and/or received. An operable connection may include a physical interface, an electrical interface, and/or a data interface. The communication interface 205 provides for wireless and/or wired communications in any now known or later developed format. The communication interface 205 may include a receiver/transmitter for digital radio signals or other broadcast mediums. The communication interface 205 may be configured to communicate model parameters with a parameter server 125.

The navigation device 122 is further configured to request a route from the starting location to the destination. The navigation device 122 may further request preferences or information for the route. The navigation device 122 may receive updated ambiguity ratings or maps from the mapping platform 121 e.g. for geographic regions including the route. The navigation device 122 may communicate with the mapping platform 121 or other navigational service using the communication interface 205. The communication interface 205 may include any operable connection. An operable connection may be one in which signals, physical communications, and/or logical communications may be sent and/or received. An operable connection may include a physical interface, an electrical interface, and/or a data interface. The communication interface 205 provides for wireless and/or wired communications in any now known or later developed format. The communication interface 205 may include a receiver/transmitter for digital radio signals or other broadcast mediums. A receiver/transmitter may be externally located from the device 122 such as in or on a vehicle. The route and data associated with the route may be displayed using the output interface 211. The route may be displayed for example as a top down view or as an isometric projection.

In certain embodiments, the device 122 may be included in or embodied as an autonomous vehicle. As described herein, an autonomous driving vehicle may refer to a self-driving or driverless mode that no passengers are required to be on board to operate the vehicle. An autonomous driving vehicle may be referred to as a robot vehicle or an autonomous driving vehicle. The autonomous driving vehicle may include passengers, but no driver is necessary. Autonomous driving vehicles may park themselves or move cargo between locations without a human operator. Autonomous driving vehicles may include multiple modes and transition between the modes.

As described herein, a highly automated driving (HAD) vehicle may refer to a vehicle that does not completely replace the human operator. Instead, in a highly automated driving mode, the vehicle may perform some driving functions and the human operator may perform some driving functions. Vehicles may also be driven in a manual mode that the human operator exercises a degree of control over the movement of the vehicle. The vehicles may also include a completely driverless mode. Other levels of automation are possible.

The autonomous or highly automated driving vehicle may include sensors for identifying the surrounding environment and location of the car. The sensors may include GNSS, light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

In an embodiment, the model stored in the device may be used by the autonomous vehicle or navigation system to provide commands or instructions to the vehicle or user. The model may, for example, assist the vehicle or navigation system in identifying a position of the vehicle, identifying objects, and determining routes among other complex functions.

In an embodiment, the model may be used to determine depth prediction for car-mounted cameras. The model may predict the distance to objects accurately with only access to optical images. The model may be trained using local data on multiple devices that included both LIDAR and camera systems. The model may be deployed on cars that only include camera systems. The training data would include both the LIDAR data and optical images. The model minimization is calculated as the average difference in prediction of depth from camera and LIDAR.

In another embodiment, a model may be trained to estimate the weather at a location of a device based on sensor data. Other devices from different geographic regions/different sensor configurations may also learn to predict the weather. The model parameters are aggregated without sharing data to produce a generalized model. In this example, label of the data may be provided by a cloud-based weather service, downloaded to the devices, in areas with high accuracy in order to predict the weather in areas of poor accuracy/coverage of the cloud-based service. The result will be a highly accurate and general model for weather prediction(estimation) on the device.

In another embodiment, a model may be trained for road sign detection. Training the model using distributed devices allows the model to have a huge quantity and diversity of data, which allows for a very general and accurate model to be trained. In another embodiment, a model may be trained to detect open parking spaces.

While the devices may only use local data to train the model or models, the devices may also access data or information from the mapping platform 121. The additional data from the mapping platform 121 may be used for navigation services or for labeling data in the training data sets.

The mapping platform 121 may include multiple servers, workstations, databases, and other machines connected and maintained by a map developer. The mapping platform 121 may be configured to receive data from devices 122 in the roadway. The mapping platform 121 may be configured to identify, verify, and augment features and locations of the features from the observational data. The mapping platform 121 may be configured to update a geographic database 123 with the features and locations. The mapping platform 121 may be configured to provide feature data and location data to devices 122. The mapping platform 121 may also be configured to generate routes or paths between two points (nodes) on a stored map. The mapping platform 121 may be configured to provide up to date information and maps to external geographic databases 123 or mapping applications. The mapping platform 121 may be configured to encode or decode map or geographic data. Feature data may be stored by the mapping platform 121 using geographic coordinates such as latitude, longitude, and altitude or other spatial identifiers. The mapping platform 121 may acquire data relating to the roadway though one or more devices 122.

The mapping platform 121 may be implemented in a cloud-based computing system or a distributed cloud computing service. The mapping platform 121 may include one or more server(s). A server may be a host for a website or web service such as a mapping service and/or a navigation service. The mapping service may provide maps generated from the geographic data of the database 123, and the navigation service may generate routing or other directions from the geographic data of the database 123. The mapping service may also provide information generated from attribute data included in the database 123. The server may also provide historical, future, recent or current traffic conditions for the links, segments, paths, or routes using historical, recent, or real time collected data. The server may receive updates from devices 122 or vehicles on the roadway regarding the HD map. The server may generate routing instructions for devices 122 as a function of HD map updates.

The mapping platform 121 includes the geographic database 123. To provide navigation related features and functions to the end user, the mapping platform 121 accesses the geographic database 123. The mapping platform 121 may update or annotate the geographic database 123 with new or changed features based on observational data from the plurality of devices 122. The plurality of devices 122 may also store a full or partial copy of the geographic database 123.

Figure 8:
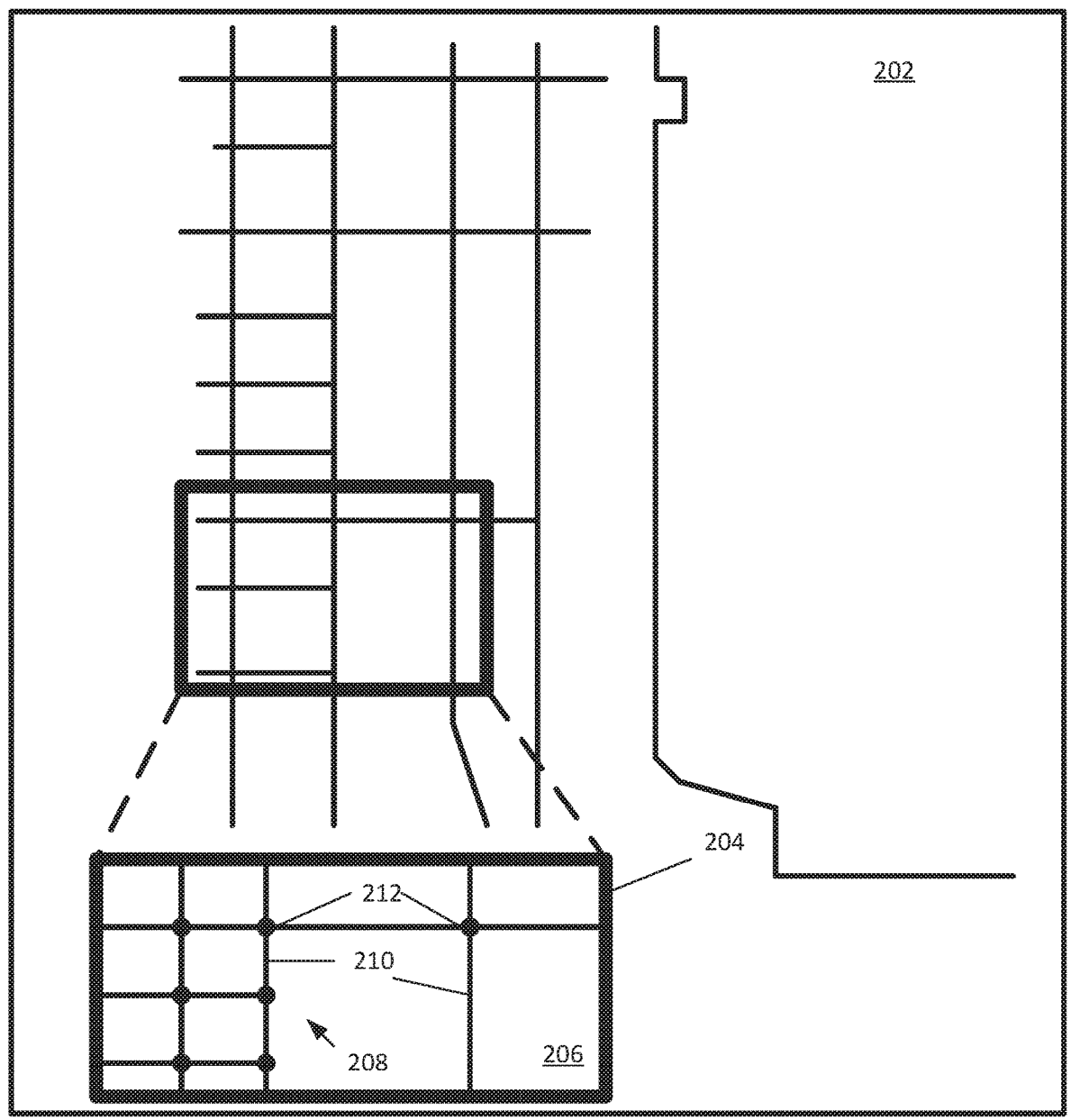
FIG. 8 depicts an example map of a geographic region.

The geographic database 123 includes information about one or more geographic regions. FIG. 8 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 8 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Each road segment 210 is shown to have associated with it two nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 9:
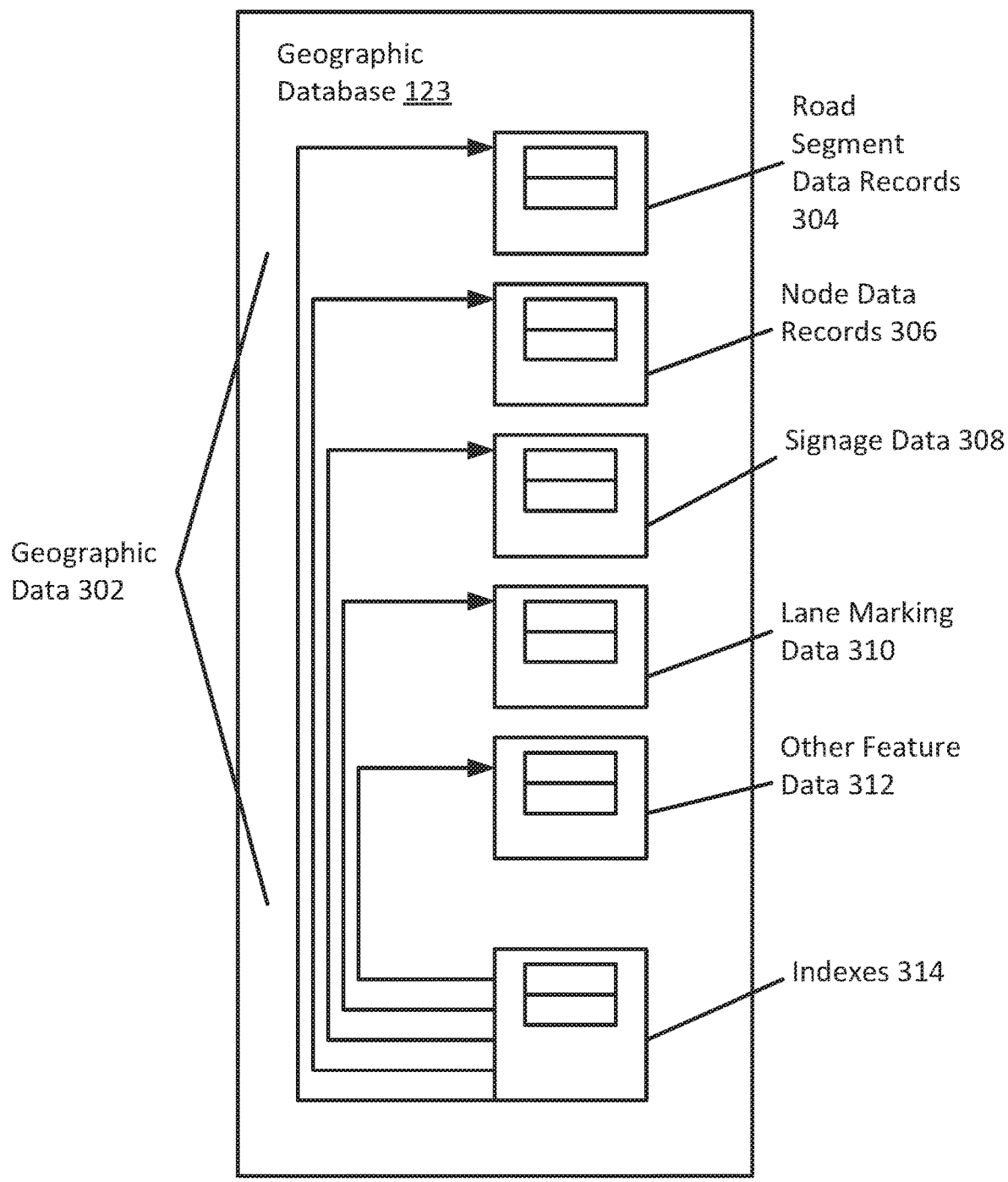
FIG. 9 depicts an example data structure of a geographic database.

As depicted in FIG. 9, in one embodiment, the geographic database 123 contains geographic data 302 that represents some of the geographic features in the geographic region 202 depicted in FIG. 8. The data 302 contained in the geographic database 123 may include data that represent the road network 208. In FIG. 9, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 308-312 may represent types of geographic features. For example, the feature data may include signage records 308 that identify the location of signage on the roadway. For example, the signage data 308 may include data for one or more signs (e.g. stop signs, yield signs, caution signs, etc.) that exist on the roadway network. The feature data may include lane features 310 that indicate lane marking on the roadway. The other kinds of feature data 312 may include point of interest data or other roadway features. The point of interest data may include point of interest records comprising a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The feature data may also include painted signs on the road, traffic signal, physical and painted features like dividers, lane divider markings, road edges, center of intersection, stop bars, overpasses, overhead bridges etc. The feature data may be identified from data received by the devices 122. More, fewer or different data records can be provided. In one embodiment, additional data records (not shown) can include cartographic ("carto") data records, routing data, and maneuver data.

The feature data 308-312 may include HD mapping data that may model road surfaces and other map features to decimeter or centimeter-level or better accuracy. An HD map database may include locations data in three dimensions with a spatial resolution of at least a threshold distance to pixel ratio. Example threshold distance ratios include 30 centimeters per pixel (i.e., each pixel in the image for the HD map represents 30 centimeters in the three-dimensional space), 20 centimeters per pixel, or other values. The HD maps may be defined according to the Open Lane Model of the Navigation Data Standard (NDS). The feature data 308-312 may also include lane models that provide the precise lane geometry with lane boundaries, as well as rich attributes of the lane models. The rich attributes include, but are not limited to, lane traversal information, lane types, lane marking types, lane level speed limit information, and/or the like. In one embodiment, the feature data 308-312 are divided into spatial partitions of varying sizes to provide HD mapping data to vehicles 101 and other end user devices 122 with near real-time speed without overloading the available resources of the devices 122 (e.g., computational, memory, bandwidth, etc. resources). The feature data 308-312 may be created from high-resolution 3D mesh or point-cloud data generated, for instance, from LIDAR-equipped vehicles. The 3D mesh or point-cloud data are processed to create 3D representations of a street or geographic environment at decimeter or centimeter-level accuracy for storage in the feature data 308-312. The feature data 308-312 may also include data the is useful for machine learning or computer vision, but not readily attribution to easy categorization as human-recognizable features.

In an embodiment, the feature data 308-312 also include real-time sensor data collected from probe vehicles in the field. The real-time sensor data, for instance, integrates real-time road event data, traffic information, weather, and road conditions (e.g., potholes, road friction, road wear, etc.) with highly detailed 3D representations of street and geographic features to provide precise real-time feature detection at decimeter or centimeter-level accuracy. Other sensor data can include vehicle telemetry or operational data such as windshield wiper activation state, braking state, steering angle, accelerator position, and/or the like.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. As another example, the indexes 314 may relate feature data such as the signage records 308 with a road segment in the segment data records 304 or a geographic coordinate. The indexes 314 may also store repeating geometry patterns or relationships for links or nodes that represent repeating geometry patterns.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway. Also, remote sensing, such as aerial or satellite photography, can be used.

The geographic database 123 and the data stored within the geographic database 123 may be licensed or delivered on-demand. Other navigational services or traffic server providers may access the traffic data and the regulatory data stored in the geographic database 123. Data including regulation data may be broadcast as a service.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, GPUs programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following embodiments are disclosed. Embodiment 1: A navigation device for training a machine learned model, the device comprising at least one sensor configured to acquire training data; a communication interface configured to communicate with a parameter server; and a device processor configured to train the machine learned model using the training data; the device processor further configured to transmit a parameter vector of the trained model to the parameter server and receive in response, an updated central parameter vector from the parameter server; the device processor further configured to retrain the model using the updated central parameter vector; wherein the navigation device acquires different training data from other devices that are training the model; wherein at least one transmission between the navigation device and the parameter server occur asynchronously with respect to the other devices that are training the model.

Embodiment 2: the navigation device of embodiment 1, wherein the training data is image data, and the machine learned model is trained to identify a position of the navigation device.

Embodiment 3: the navigation device of embodiment 1, wherein the training data is image data, and the machine learned model is trained to identify an object in the image data.

Embodiment 4: the navigation device of embodiment 1, wherein training the machine learned model includes a gradient descent-based process.

Embodiment 5: the navigation device of embodiment 1, wherein the at least one sensor is embedded in a vehicle.

Embodiment 6: the navigation device of embodiment 1, wherein the machine learned model comprises a generative adversarial network, wherein the device processor is configured to train the machine learnt model using an adversarial training process.

Embodiment 7: the navigation device of embodiment 1, wherein the navigation device acquires different amounts of training data from the other devices.

Embodiment 8: the navigation device of embodiment 1, wherein the updated central parameter vector is updated by the parameter server as a function of a weighting value.

Embodiment 9: the navigation device of embodiment 1, wherein the parameter vector comprises a randomly selected subset of parameters of the trained model.

Embodiment 10: the navigation device of embodiment 1, wherein the training data is labeled, and the machine learned model is trained using a supervised training process.

Embodiment 11: the navigation device of embodiment 1, wherein the updated central parameter is transmitted to the device prior to the updated central parameter being altered again.

Embodiment 12: a method for training a machine learned model using a plurality of distributed worker devices, the method comprising: training, by a worker device, a machine learned model using local training data and a set of first parameters; transmitting, by the worker device, a set of second parameters of the trained machine learned model to a parameter server; receiving, by the worker device, a set of third parameters from the parameter server, wherein the set of third parameters is calculated at least partially as a function of the set of second parameters; and training, by the worker device the machine learned model using the local training data and the set of third parameters.

Embodiment 13: the method of embodiment 12, further comprising: transmitting, by the work device, a set of fourth parameters of the trained machine learned model to the parameter server.

Embodiment 14: the method of embodiment 12, wherein the third parameter is received asynchronously from the parameter server.

Embodiment 15: the method of embodiment 12, wherein the set of first parameters comprises a randomly assigned set of values.

Embodiment 16: the method of embodiment 12, wherein the local training data is accessible only on the worker device.

Embodiment 17: the method of embodiment 12, wherein the local training data is image data and the machine learned model is an image recognition machine learned model.

Embodiment 18: the method of embodiment 17, further comprising: acquiring, by the worker device, new image data; and identifying, by the worker device, an object in the new image data using the trained machine learned model.

Embodiment 19: the method of embodiment 12, further comprising: determining a randomly chosen subset of parameters of the set of second parameters; wherein the randomly chosen subset of parameters is transmitted to the parameter server in place of the set of second parameters Embodiment 20: a system for training a machine learned model, the system comprising: a parameter server configured to communicate with the plurality of worker devices; the parameter server configured to receive locally generated sets of parameters of the trained machine learned models from the plurality of worker devices; the parameter server configured to calculate and transmit, in response to a communication from a worker device of the plurality of worker devices, a set of central parameters to the respective worker device from which the communication originated. The plurality of worker devices are configured to train the machine learned model using a set of parameters and respective sets of locally acquired training data.

Embodiment 21: the system of embodiment 20, further comprising a master parameter server configured to communicate with a plurality of parameter servers; the master parameter server configured to receive central parameters from the plurality of parameter servers; the master parameter server configured to calculate and transmit, in response to a communication from the parameter servers of the plurality of parameter servers, a set of global central parameters to a respective parameter server from which the communication originated.

Embodiment 22: the system of embodiment 20, wherein the respective sets of locally acquired training data are only accessible by the respective worker devices of the plurality of worker devices.

Embodiment 23: the system of embodiment 20, wherein the parameter server is configured to communicate asynchronously with the plurality of worker devices.

Embodiment 24: the system of embodiment 21, wherein the master parameter server is configured to communicate with both the plurality of parameter servers and the plurality of worker devices.

The invention claimed is:

1. A navigation device for training a machine learned model, the navigation device comprising
at least one sensor configured to generate training data;
a communication interface configured to communicate with a parameter server; and
a device processor configured to train the machine learned model using the training data; the device processor further configured to transmit a parameter vector of the trained machine learned model to the parameter server and receive in response, an updated central parameter vector from the parameter server; the device processor further configured to retrain the machine learned model using the updated central parameter vector;
wherein the training data is different than training data that is generated and used by other navigation devices that are training the machine learned model, wherein the training data is not available centrally for use in training the machine learned model;
wherein at least one transmission between the navigation device and the parameter server occur asynchronously with respect to the other navigation devices that are training the machine learned model.

2. The navigation device of claim 1, wherein the training data is image data, and the machine learned model is trained to identify a position of the navigation device.

3. The navigation device of claim 1, wherein the training data is image data, and the machine learned model is trained to identify an object in the image data.

4. The navigation device of claim 1, wherein training the machine learned model includes a gradient descent-based process.

5. The navigation device of claim 1, wherein the at least one sensor is embedded in a vehicle.

6. The navigation device of claim 1, wherein the machine learned model comprises a generative adversarial network, wherein the device processor is configured to train the machine learned model using an adversarial training process.

7. The navigation device of claim 1, wherein the navigation device generates different amounts of training data from the other navigation devices.

8. The navigation device of claim 1, wherein the updated central parameter vector is updated by the parameter server as a function of a weighting value.

9. The navigation device of claim 1, wherein the parameter vector comprises a randomly selected subset of parameters of the trained machine learned model.

10. The navigation device of claim 1, wherein the training data is labeled, and the machine learned model is trained using a supervised training process.

11. A method for training a machine learned model using a plurality of distributed worker devices, the method comprising:
training, by a worker device, a machine learned model using locally generated training data and a set of first parameters, wherein the locally generated training data is generated by and remains on the worker device and is not available centrally for training the machine learned model;
transmitting, by the worker device, a set of second parameters of the trained machine learned model to a parameter server;
receiving, by the worker device, a set of third parameters from the parameter server, wherein the set of third parameters is calculated at least partially as a function of the set of second parameters; and
training, by the worker device the machine learned model using the locally generated training data and the set of third parameters.

12. The method of claim 11, further comprising:
transmitting, by the work device, a set of fourth parameters of the trained machine learned model to the parameter server.

13. The method of claim 11, wherein the set of third parameters are received asynchronously from the parameter server.

14. The method of claim 11, wherein the set of first parameters comprises a randomly assigned set of values.

15. The method of claim 11, wherein the local generated training data is image data and the machine learned model is an image recognition machine learned model.

16. The method of claim 15, further comprising:
generating, by the worker device, new image data; and
identifying, by the worker device, an object in the new image data using the trained machine learned model.

17. The method of claim 11, further comprising:
determining a randomly chosen subset of parameters of the set of second parameters; wherein the randomly chosen subset of parameters is transmitted to the parameter server in place of the set of second parameters.

18. A system for training a machine learned model, the system comprising:
a parameter server configured to communicate with a plurality of worker devices; the parameter server configured to receive locally generated sets of parameters of the trained machine learned model from the plurality of worker devices; the parameter server configured to calculate and transmit, in response to a communication from a worker device of the plurality of worker devices, a set of central parameters to a respective worker device from which the communication originated;
wherein the plurality of worker devices are configured to train the machine learned model using the set of central parameters and respective sets of locally generated training data, wherein the respective sets of locally generated training data remain on respective worker devices of the plurality of worker devices and is not shared centrally for use in training the machine learned model.

19. The system of claim 18, further comprising
a master parameter server configured to communicate with a plurality of parameter servers; the master parameter server configured to receive central parameters from the plurality of parameter servers; the master parameter server configured to calculate and transmit, in response to a communication from the parameter servers of the plurality of parameter servers, a set of global central parameters to a respective parameter server from which the communication originated.

20. The system of claim 19, wherein the master parameter server is configured to communicate with both the plurality of parameter servers and the plurality of worker devices.

21. The system of claim 18, wherein the parameter server is configured to communicate asynchronously with the plurality of worker devices.

* * * * *